June 17, 1924.
M. F. HILL
1,498,167
PORTABLE AUTOMATIC ARC WELDER
Filed April 26, 1919
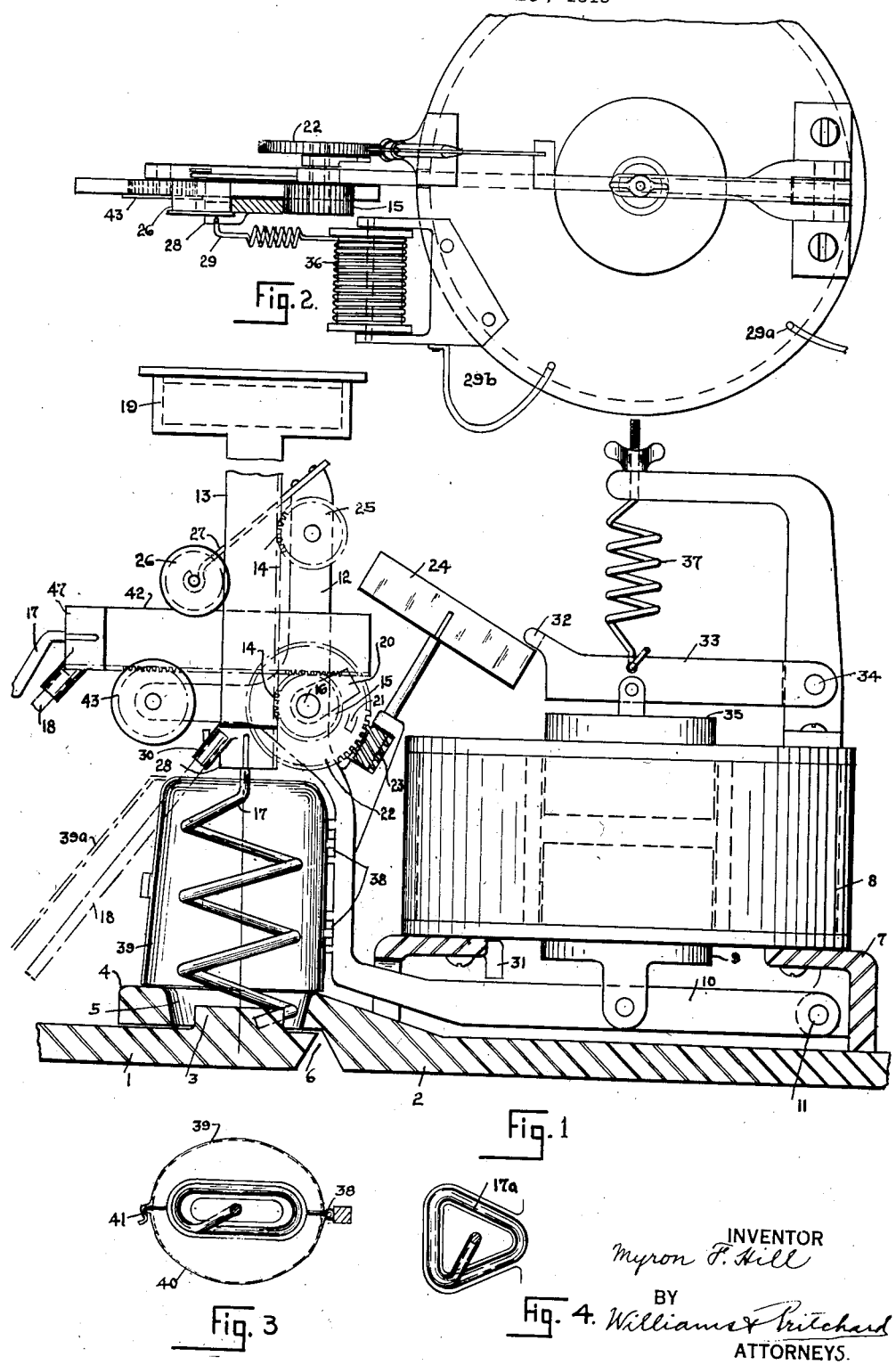
INVENTOR
Myron F. Hill
BY Williams & Pritchard
ATTORNEYS.

Patented June 17, 1924.

1,498,167

UNITED STATES PATENT OFFICE.

MYRON F. HILL, OF NEW YORK, N. Y.

PORTABLE AUTOMATIC ARC WELDER.

Application filed April 26, 1919. Serial No. 293,002.

*To all whom it may concern:*

Be it known that MYRON F. HILL, citizen of the United States, residing in the city, county, and State of New York, has invented an Improvement in Portable Automatic Arc Welders, of which the following is a specification.

My invention relates to a portable automatic arc welder.

One of the objects of my invention is an automatic arc welder that is universal, capable of welding in a horizontal or vertical direction.

Another object is an automatic arc welder in which the welding head does not travel along the seam, but travels perpendicularly thereto, and in which the welding wire is bent, curved or inclined in such a way that as it is melted away by the arc, the arc travels along the groove which may be straight or curved in which the welding metal is to be deposited.

Another object of my invention is a welding instrument in which the welding current contains in its circuit means to maintain an even arc.

Another object is an instrument adapted, when the arc becomes extinguished for any reason, to automatically redraw the arc and continue operations without attention of the operator.

Another object is to maintain an equal resistance in the welding circuit of the instrument during the operation of welding.

Another object is to shield the arc by some means to prevent it being visible to other operators in the vicinity.

My invention contains such other features and objects as will be evident from the description which follows:

In the drawings:

Fig. 1 is a part sectional elevation of my instrument with some of the portions removed.

Fig. 2 is a plan view of the same.

Fig. 3 shows a plan view of a form of welding wire for welding a particular form of groove.

Fig. 4 shows a modification thereof.

In the drawings Fig. 1 represents a plate 1 adapted to be welded to another plate 2, the edges of which may be provided with a series of studs similar to that shown at 3 cast integrally with the plate 1, and the overlapping portion 4 of the plate 2 may be provided with holes or slots 5.

The plates are also so formed as to provide a groove 6 that is adapted to be filled with welding metal. Such plates are of particular value for sheet steel instrumentalities which are subject to great tensile strains, and the joint provided insures against damage to the instrumentalities in case welding should be defective. The automatic instrument adapted to weld these joints is illustrated in the figures. A base 7 may carry a solenoid or electromagnetic device 8, having a magnetic core 9 loosely linked to the lever 10 which may be pivoted at 11 to the base, and which may have upon its other end 12, electrode carrying and feeding appliances. For example; a rack 13, having teeth illustrated at 14, meshing with a gear wheel 15 and fixed to a shaft 16, may be provided to feed a welding wire 17 or 18 according to the kind of a seam to be welded. The rack 13 may be provided with a weight 19 to cause it to travel downward, which has the effect of rotating the shaft 16. This shaft carries the fixed arm 20 adapted to engage the stud 21 upon the loosely journalled wheel 22, thereby tending to rotate said wheel 22. This wheel may be a worm gear to mesh with a worm 23 mounted upon bearings with the lever 10 as indicated and the worm shaft provided with a fan 24 adapted to rotate under the influence of the worm gear thereby retarding the feeding action of the rack 13 under the influence of the weight 19. The rack 13 may be guided also by the grooved pinion 25 journalled in the end 12 of the lever and by the rotatable grooved pressure wheel 26 mounted upon a spring 27 and adapted to press the rack 13 into engagement with the gear wheel 15 and to prevent its escape therefrom under the influence of the weight 19. The lower end of the rack 28 is preferably insulated from the rest of the machine and a conductor attached thereto as shown at 29 in Fig. 2 to supply the current to the welding wire. A welding wire 17 may be employed, adapted to travel downward as the arc melts the lower end away, and thereby fill the groove around the stud 3 in the hole 5 so as to weld them together. Or if it is desired to fill a straight groove 6, the plates may be turned over and the instrument rested upon the opposite side of the plates and the welding wire 18 substituted which is fastened in any suitable clip at 30. As the lower end of the wire 18 is melted away and as the rack 13 travels downward, the arc travels along the seam. By substituting gravity action of this kind an electric motor is rendered unnecessary for performing these operations. The lever 10 is drawn upward by the solenoid core 9 until it engages a stop 31 to prevent further upward motion thus limiting the length of the initial arc. At this time the fan 24 is brought into such a position that it is adapted to be stopped by the end 32 of the lever 33 which is pivoted at 34 and is linked to the core 35 of the solenoid. This action takes place when the current in the solenoid, due to too short an arc, becomes strong enough to pull the lever 33 downward. When this lever is so pulled the end 32 is interposed in the circular path which the fan 24 rotates in and stops it. When the arc has melted away the wire sufficiently to restore the arc to its normal length the current of the solenoid is thereby reduced and the lever 33 is thereby released so that the stop 32 is withdrawn from the path of the fan 24 and the fan is thereby enabled to continue its rotating motion to permit the descent of the rack 13. The conductor 29 in Fig. 2 may be wound around the reel 36 which is caused to unwind and lengthen the distance between the end of the wire attached to the electrode and the point along the conductor 29 at which the current enters it from the reel. The object of this is to increase the resistance of the conductor to compensate for the decrease of resistance in the electrode as it becomes shorter during the operation of welding. This is facilitated by providing a conductor 29 which, while flexible, has the same resistance per lineal inch as that of the wire electrode. Thus the total electrical resistance of the welding circuit is not disturbed by shortening the electrode during the operation of welding. The spring 37 is connected with the level 33 and opposes the pull of the solenoid to facilitate the action hereinbefore described of the lever 33.

If for any reason the arc should become extinguished the solenoid releases the core 9 permitting the lever 10 to thereby reestablish the circuit, which has the effect of energizing the coil 8 causing the core 9 to draw the arc, after which the operation of welding will continue as before.

Hinged to the lever at 38 are two halves of a shield or cover 39 and 40, illustrated in Fig. 3, adapted to be closed around the arc and held closed by a clip 41. This may be opened when it is desired to insert a new electrode wire into the rack 13. The rack at this time may be lifted entirely out of the mechanism, or lifted sufficiently to insert the new wire and then permitted to drop until the wire makes contact with the work in which case the welding is automatically resumed as hereinbefore described.

In order to perform welding with a horizontally acting head an additional rack 42 may be employed engaging with the same gear wheel 15 and operated thereby and guided by an additional grooved wheel 43. The end 47, of this rack 42, may be insulated from the rest of the rack and be provided with means to grip and hold an electrode 17, or an electrode 18, and adapted to perform operations, similar to those already described, upon plates arranged in a vertical position as distinguished from the horizontal position of plates shown in Fig. 1. The clip adapted to hold the wire 18 may be in any position desired to project the wire 18 at such an angle or position with relation to the position of the instrument as will weld a seam in any direction, whether the seam be upon the side of the object or upon the bottom or the top. Other racks may be arranged in other positions if desired to operate overhead by similar construction.

I prefer to employ a hood 39 or 39$^a$ for an electrode wherever it may be placed in order to protect the eyes of other operators from any arc.

Fig. 4 shows a form of welding wire adapted to weld a groove around a triangular stud. Any other suitable form may be employed according to the requirements of the case.

The circuit preferably enters from the source of power to the solenoid, say at 29$^a$, and issues from the solenoid and is connected to the reel supported at 29$^b$, after which it passes through the reel, traverses the conductor 29 and electrode wire, passes across the arc to the work and then back to the source of power.

While I have described my invention in the particular form in which I prefer to use it, I would have it understood that there are many other applications of the same principles lying within the scope of my invention.

What I desire to secure Letters Patent for is:

1. An electric welding instrument adapted to weld along a line containing a welding head located over said line and adapted to travel bodily towards said line in a direction normal thereto, and an electrode of welding metal carried by said welding head at an angle to the line to cause it to be fed along said line.

2. The combination claimed in claim 1 having gravity means to operate said welding head.

3. The combination claimed in claim 1 having a retardation device to render the operation of said head slow for welding purposes.

4. The combination claimed in claim 1 having electromagnetic means influenced by the welding circuit to retard the feed of said wire into said groove sufficiently to maintain an arc of even resistance.

5. The combination claimed in claim 1 having means to automatically redraw the arc when it has been extinguished and when it is provided with a welding electrode of sufficient length for welding.

6. In a welding instrument, two welding heads operable at angles with relation to each other, gravity means for operating said welding heads, attachments upon said welding heads to receive welding wire in any one of a plurality of positions.

7. The combination claimed in claim 1, having also a horizontally acting welding head carrying a similar electrode, means to project said welding head in a horizontal direction and thereby weld a line upon the side of a weldable object arranged normal to the axis of operation of said welding head.

8. The combination claimed in claim 7 having gravity means to operate the same.

9. In an automatic arc welder carrying a metal electrode for welding a seam or joint along a piece of welding work, a hood surrounding the arc and having an aperture for the passage of the electrode, said hood fitting against said work and preventing rays of energy from escaping to the detriment of other welders in the vicinity and automatic means for feeding the electrode through said aperture.

10. In a welding instrument carrying a metal welding electrode a conductor connecting the welding electrode to the source of current and automatic means to increase the resistance to compensate for the reduced resistance of the electrode as it is melted away during welding.

11. An electric arc welding instrument having a head adapted to travel bodily towards a welding seam, and a metal electrode carried at an angle to said direction of motion, and advanced by said head towards and along the seam to maintain the arc at a rate to compensate for the melting of said electrode during welding.

12. The combination claimed in claim 11 having means to retard a too rapid feed of said electrode.

13. The combination claimed in claim 11 having said means responsive to variations in the welding current due to variations in the resistance of the arc.

14. The combination claimed in claim 11, having means to automatically redraw the arc when it becomes extinguished.

15. The combination claimed in claim 1 having means advanced by said head to hold a plurality of electrodes, each adapted to move in a different direction.

16. The combination claimed in claim 1 having means to automatically draw the arc upon switching on the welding current.

17. The combination claimed in claim 16 having said means including electro-magnetic motor devices associated with mechanical means to regulate the feed of the electrode.

18. The combination claimed in claim 1 having an electrode holder geared to said head to be advanced in a direction different from the direction of advance of said head.

In testimony whereof, I have affixed my signature to this specification.

MYRON F. HILL.